US006404467B1

(12) United States Patent
Zeiger et al.

(10) Patent No.: US 6,404,467 B1
(45) Date of Patent: Jun. 11, 2002

(54) LIQUID CRYSTAL DISPLAY APPARATUS AND METHOD

(75) Inventors: David R. Zeiger, Palatine; Kevin J. Schechtel, Arlington Heights; David J. Galovich, Roselle; Kathleen A. Stunkel, Arlington Heights, all of IL (US)

(73) Assignee: 3Com Corporation, Rolling Meadows, IL (US)

( * ) Notice: Subject to any disclaimer, the term of this patent is extended or adjusted under 35 U.S.C. 154(b) by 0 days.

(21) Appl. No.: 09/385,269

(22) Filed: Aug. 30, 1999

(51) Int. Cl.$^7$ ............................................. G02F 1/1333
(52) U.S. Cl. ........................................ 349/58; 353/119
(58) Field of Search ............................. 349/58, 16, 59; 353/119; 361/681

(56) References Cited

U.S. PATENT DOCUMENTS

| | | | | |
|---|---|---|---|---|
| 4,870,531 A | * | 9/1989 | Danek ........................... 361/93 |
| 5,193,047 A | * | 3/1993 | Barratt et al. ................ 361/212 |
| 5,486,847 A | * | 1/1996 | Ranf et al. .................... 345/173 |
| 5,544,959 A | * | 8/1996 | Collin et al. ................. 335/202 |
| 5,596,343 A | * | 1/1997 | Snider ......................... 345/102 |
| 5,940,153 A | * | 8/1999 | Castaneda et al. ............. 349/58 |
| 5,954,386 A | * | 9/1999 | Thomas ...................... 296/97.2 |
| 6,115,243 A | * | 9/2000 | Horii .......................... 361/684 |

FOREIGN PATENT DOCUMENTS

JP          409230365 A    *  9/1997

OTHER PUBLICATIONS

Gilo et al.; "Transparent indium tin oxide films prepared by ion-assisted deposition with a single-layer overcoat"; Opt. Eng. vol. 38(6), Jun. 1999, pp. 953–957 (1999).*

Bright; "Broadband EMI shielding for electro-Optical systems"; Electromangetic Comatibiltiy, 1994 Symposium Record, Compalibility in the loop, IEEE International Symposium, pp. 340–342 (1994).*

* cited by examiner

Primary Examiner—William L. Sikes
Assistant Examiner—Hoan Nguyen
(74) Attorney, Agent, or Firm—Baniak Pine & Gannon

(57) ABSTRACT

A liquid crystal display apparatus includes a housing and a button array contacting the housing. The button array includes a plurality of buttons and is positioned between the housing and a transparent shield. The transparent shield is attached to the housing to secure the button array to the housing. The transparent shield is positioned between the button array and a liquid crystal display to shield the liquid crystal display.

21 Claims, 4 Drawing Sheets

LIQUID CRYSTAL DISPLAY APPARATUS AND METHOD

FIELD OF THE INVENTION

The present invention relates generally to the field of liquid crystal displays and, in particular, to liquid crystal display apparatus for an electronic device.

BACKGROUND OF THE INVENTION

Conventional liquid crystal displays are commonly used in a wide variety of electronic devices such as, for example, speakerphones, facsimile machines, VCR's, etc. These liquid crystal displays include a glass panel display that typically provides a digital readout. Usually, a liquid crystal display is mounted onto a printed circuit board that controls the liquid crystal display. A button array subassembly for the liquid crystal display is typically provided to allow a user to interact with the liquid crystal display. The button array includes a seating plane that rests on the circuit board that controls the liquid crystal display. When the user depresses one of the buttons, a conductive end portion of that button contacts the circuit board to provide an electrical connection with the circuit board.

Problems arise with regard to mounting conventional liquid crystal displays within electronic devices. Typically, there are numerous individual parts that are required in order to mount the liquid crystal display within the housing. There are typically high costs associated with these parts. Moreover, multiple steps are required during the assembly process due to the numerous parts, which also increases manufacturing costs. For example, a transparent protective cover is assembled over the liquid crystal display to protect the glass panel display. This is typically accomplished by providing an injection molded transparent plastic cover that is formed on the outer housing of the electronic device. However, this is an expensive process, and the transparent plastic cover is susceptible to scratches during the manufacturing, packaging and shipping process.

Alternatively, attempts have been made to provide a separate transparent cover that is typically affixed with adhesives. Although this solution may provide certain cost benefits compared to injection molding, this approach is not as reliable due to the failure of adhesives in various environments. Also, additional steps in the manufacturing process are required to apply the adhesive and secure the transparent cover over the glass panel of the liquid crystal display.

In addition to the transparent cover, a separate plastic part is required to secure the button subassembly in a fixed relation with respect to the housing. This also increases the manufacturing costs due to the high cost of the part, and the additional steps that are required during the manufacturing process.

Finally, problems arise during the assembly process in connection with the alignment of the button array with respect to the circuit board. In particular, because the seating plane of the button array is typically seated on the circuit board, the button array must be perfectly aligned with the circuit board so that the buttons contact the proper region of the circuit board when they are depressed. Ensuring proper alignment of these parts is a difficult and time-consuming process, which also increases manufacturing costs.

Accordingly, it would be desirable to have a liquid crystal display apparatus that overcomes the disadvantages described above and to provide a simple and cost-effective liquid crystal display apparatus.

SUMMARY OF THE INVENTION

One aspect of the invention provides a liquid crystal display apparatus including a housing and button array contacting the housing. The button array includes a plurality of buttons and is positioned between the housing and a transparent shield. The transparent shield is attached to the housing to secure the button array to the housing. The transparent shield is positioned between the button array and a liquid crystal display to shield the liquid crystal display. The housing may preferably include a plurality of button openings to allow the plurality of buttons to be received in the plurality of button openings. Each of the plurality of buttons may preferably include a manually operable portion. The manually operable portion of each of the plurality of buttons may preferably be received in the plurality of button openings.

The transparent shield may preferably include a plurality of transparent shield openings. The plurality of buttons may preferably be received in the plurality of transparent shield openings. Each of the plurality of buttons may preferably include a conductive end portion. The conductive end portion of each of the plurality of buttons may preferably be received in the plurality of transparent shield openings. The housing may preferably include an inner surface, and the button array may preferably contact the inner surface of the housing. The transparent shield may preferably be comprised of a polycarbonate or an acrylic resin. A circuit board may also be provided, and the liquid crystal display may be attached to the circuit board. The circuit board may preferably be attached to the housing. The housing may also preferably include a plurality of flange portions, and the circuit board may preferably be attached to the plurality of flange portions. The housing may preferably include at least one liquid crystal display opening to allow viewing of the glass panel of the liquid crystal display. Each of the plurality of buttons may preferably include a conductive end portion for contacting a circuit board. A connector may preferably be operatively connected to the circuit board.

Another aspect of the invention provides a liquid crystal display apparatus including a housing and a button array contacting the housing. The button array includes a plurality of buttons. The button array is positioned between the housing and a transparent shield. The transparent shield is attached to the housing to secure the button array to the modem housing. A circuit board is provided with a liquid crystal display mounted to the circuit board. The transparent shield is positioned between the button array and the circuit board to shield the liquid crystal display.

Another aspect of the invention provides a method of assembling a liquid crystal display apparatus. A housing, a button array including a plurality of buttons and a transparent shield is provided. The button array is contacted with the housing and is positioned between the housing and the transparent shield. The transparent shield is attached to the housing. The button array is secured to the housing. The transparent shield is positioned between the button array and a liquid crystal display, and the liquid crystal display is shielded. A circuit board may also be provided. The liquid crystal display may preferably be attached to the circuit board, and the circuit board may preferably be attached to the housing. The housing may preferably include a plurality of flange portions, and the circuit board may preferably be attached to the plurality of flange portions. The housing may preferably include a plurality of button openings, and the plurality of buttons may be inserted into the plurality of button openings. The transparent shield may preferably include a plurality of transparent shield openings. The plurality of buttons may preferably be inserted in the plurality of transparent shield openings. The housing may preferably include an inner surface, and the button array may preferably be contacted with the inner surface of the housing.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims- and equivalents thereof.

DETAILED DESCRIPTION OF THE PRESENTLY PREFERRED EMBODIMENTS

Figure 1:
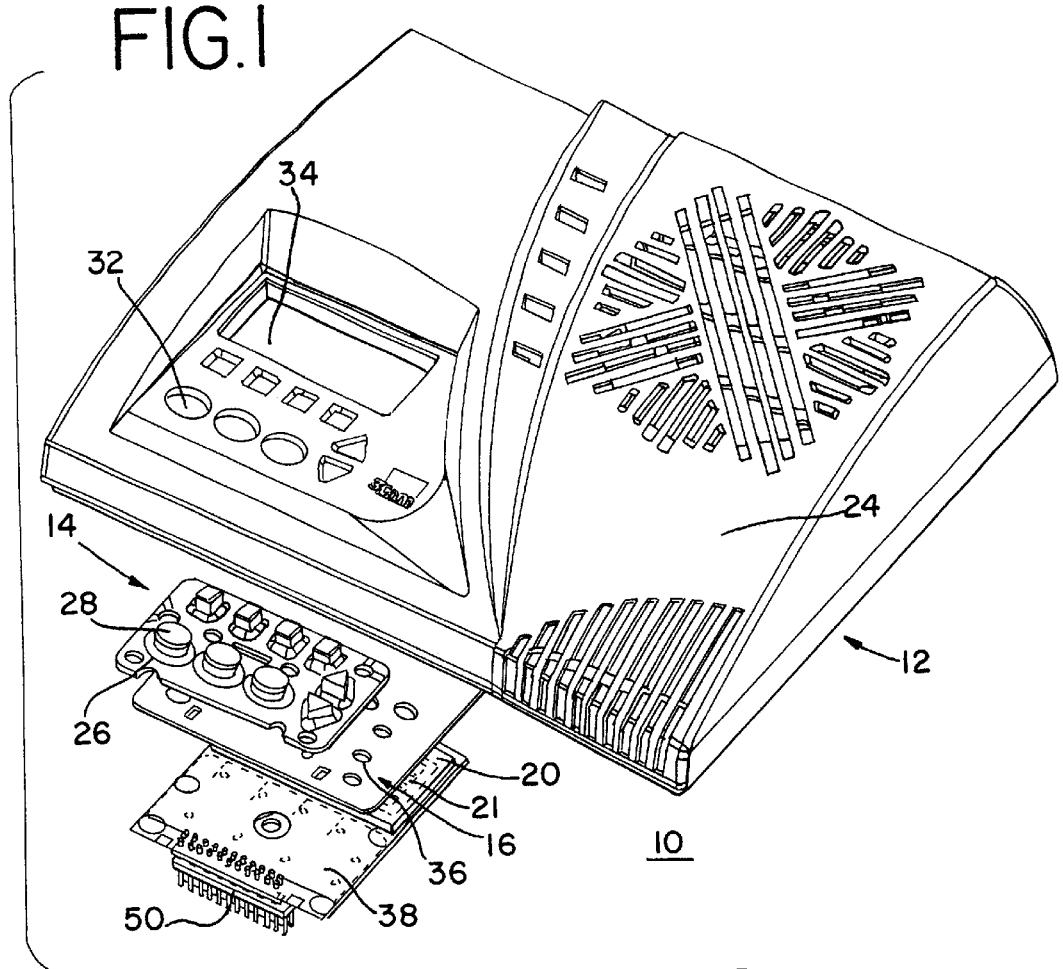
FIG. 1 is a perspective exploded view of a preferred embodiment of a liquid crystal display apparatus made in accordance with the invention.
Figure 2:
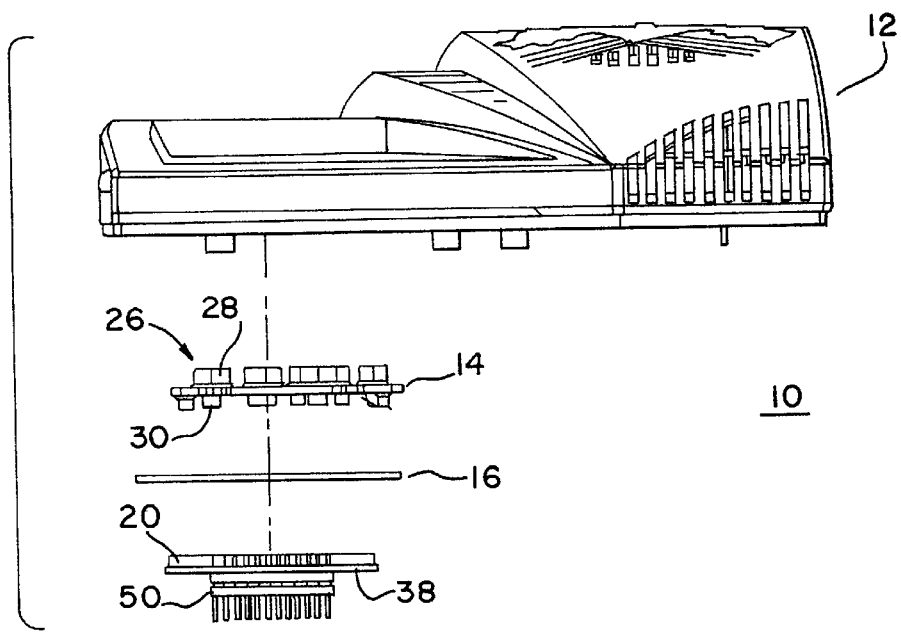
FIG. 2 is a reduced front view of the embodiment of FIG. 1.
Figure 3:
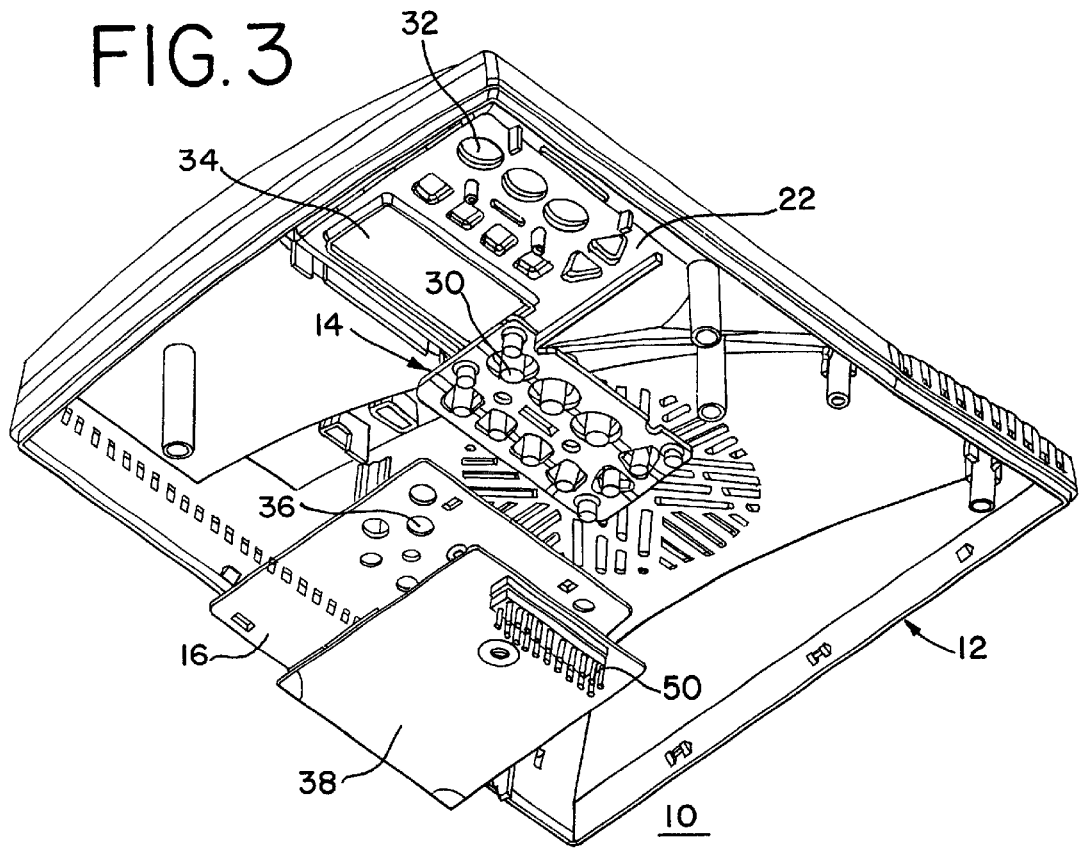
FIG. 3 is an exploded perspective view showing the inside surface of the housing, the button array, the transparent shield, and the circuit board.

Referring to FIGS. 1–3, a preferred embodiment of a liquid crystal display apparatus 10 includes a housing 12, a button array 14, a transparent shield 16 and a liquid crystal display 20 (see FIG. 3). The liquid crystal display 20 may preferably be any conventional liquid crystal display, and may vary in size depending on the number of functions to be performed and the amount of data to be displayed on the glass panel 21 of the liquid crystal display 20. The housing 12 may preferably be any conventional housing for a wide variety of electronic devices. In the embodiment shown, for example, the housing 12 may preferably be an outer cover for an electronic modem device. The housing 12 may preferably have an inner surface 22 and an outer surface 24. The housing 12 may be comprised of any suitable rigid material such as, for example, plastic.

Figure 4:
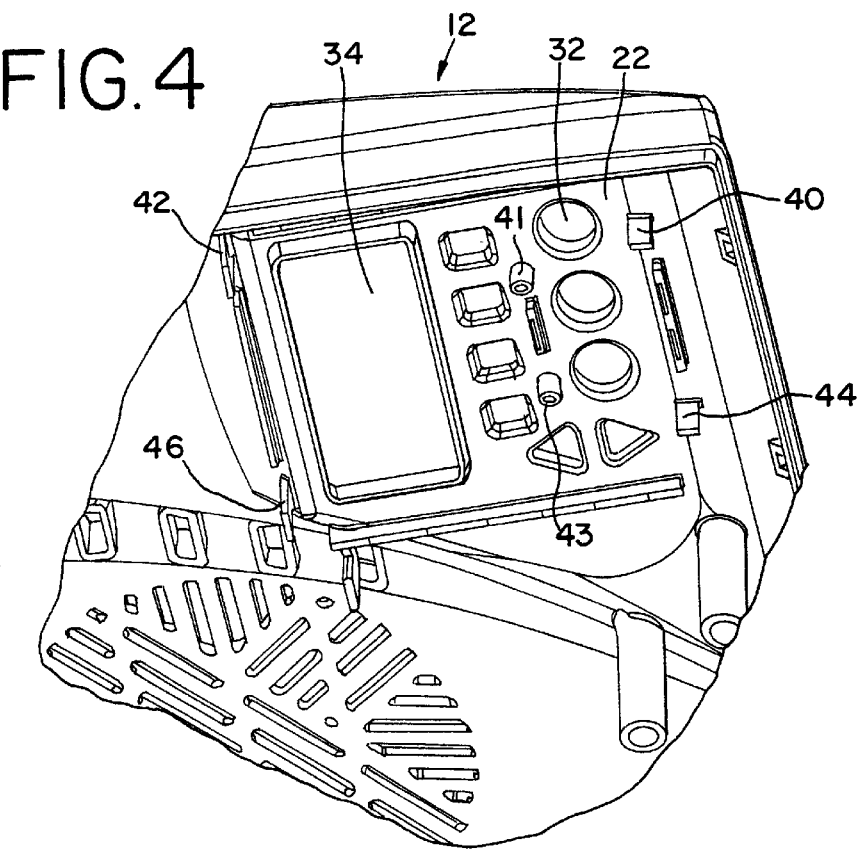
FIG. 4 is an enlarged partial view of the embodiment of FIG. 3 showing the inner surface of the housing.
Figure 5:
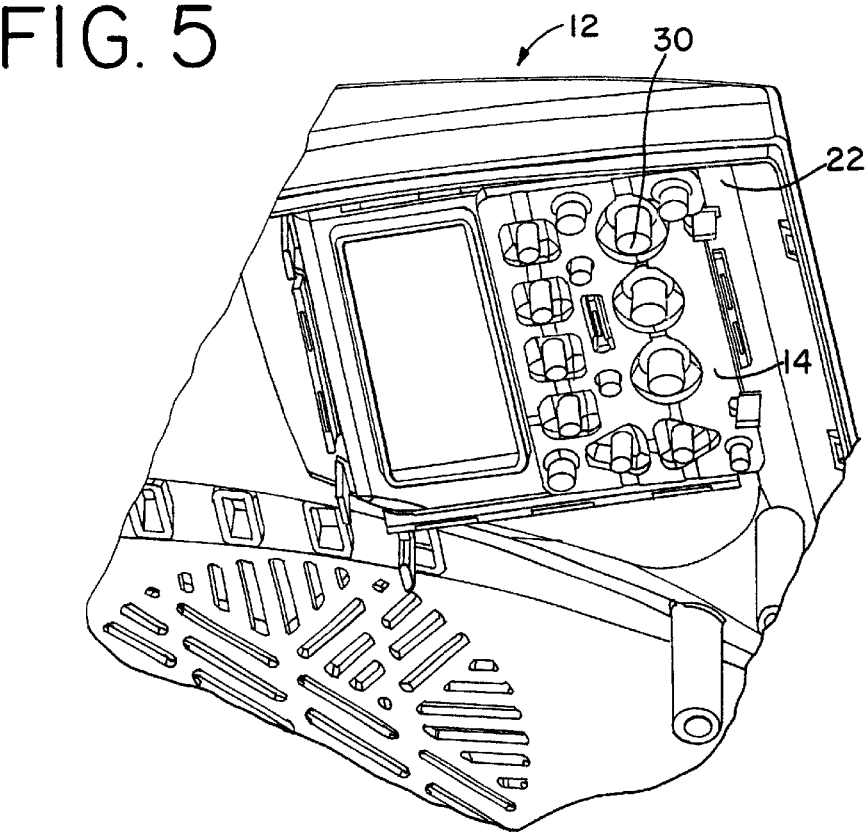
FIG. 5 is the embodiment shown in FIG. 4 showing the button array in contact with the inner surface of the housing.
Figure 6:
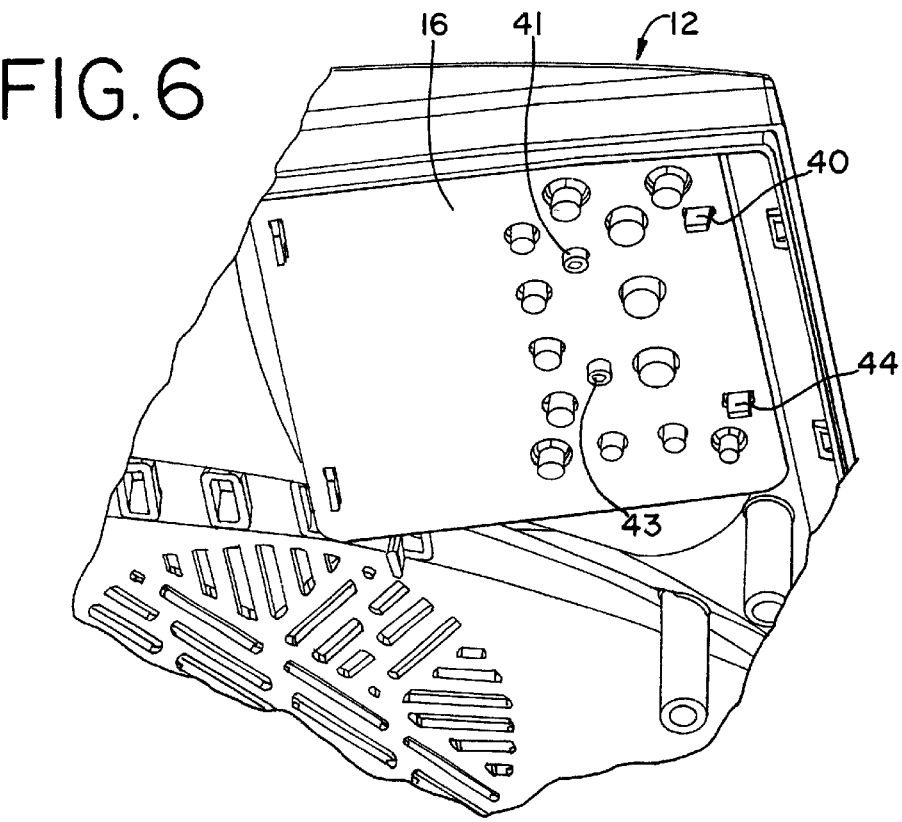
FIG. 6 is the embodiment of FIG. 5 showing the transparent shield attached to the housing.

Referring to FIGS. 4–6, the button array 14 contacts the housing 12. In particular, the button array 14 contacts the inner surface 22 of the housing 12. As shown in FIGS. 1–6, the button array 14 is positioned between the housing 12 and the transparent shield 16. Referring to FIGS. 1–2, the button array 14 includes a plurality of buttons 26 that each include a manually operable end portion 28 that allows a user to depress the plurality of buttons 26 to access the various functions of the electronic device. Referring to FIGS. 2–3 and 5, each of the plurality of buttons 26 may also include a conductive end portion 30 opposite the manually operable end portion 28. The conductive end portion 30 may preferably be comprised of any suitable conductive material. The conductive end portion may preferably be a conventional conductive carbon pill. The number of buttons 26 in the button array 14 may vary depending upon the particular application and the number of desired functions programmed in the device. The button array 14 may preferably be any conventional button array. For example, the button array 14 may preferably be a silicon button array.

In the embodiment shown in FIGS. 1–3 and 6, the button array 14 is positioned between the inner surface 22 of the housing 12 and the transparent shield 16. The transparent shield 16 retains the button array 14 and serves as a protective shield for the glass panel 21 of the liquid crystal display 20. In particular, the transparent shield 16 is attached to the housing 12, which in turn secures the button array 14 to the inner surface 22 of the housing 12. The transparent shield 16 may preferably be attached to the housing 12 by any conventional means. For example, the transparent shield 16 may preferably be sonically welded to the housing 12. Alternatively, adhesive materials may be used to attach the transparent shield 16 to the housing 12.

As shown in FIGS. 1–3, and 7, the transparent shield 16 is positioned between the button array 14 and the liquid crystal display 20. As a result, the transparent shield 16 shields and protects the glass panel 21 of the liquid crystal display 20 from a user. At the same time, the transparent shield 16 allows the user to view the glass panel 21 of the liquid crystal display 20. The transparent shield 16 reduces the number of parts required to retain the button array 14 and shield the liquid crystal display 20. The reduction of parts in turn reduces the number of steps required during the assembly process thereby reducing manufacturing costs. The transparent shield 16 may be comprised of any suitable transparent material such as, for example, plastic or any other suitable polycarbonate. Alternatively, the transparent shield 16 may be comprised of any suitable acrylic resin. The transparent shield 16 may preferably be a one-piece design, and may preferably be stamped from sheeted material. This results in significant cost savings from a tooling and material standpoint.

Referring to FIGS. 1 and 3–4, the housing 12 may preferably include a plurality of button openings 32. The plurality of button openings 32 may preferably receive the plurality of buttons 26 of the button array 14. In particular, the plurality of button openings 32 may preferably receive the manually operable end portion 28 of the plurality of buttons 26. The housing 12 may also preferably include at least one liquid crystal display opening 34 to allow a user to view of the glass panel 21 of the liquid crystal display 20.

Referring to FIGS. 1 and 3, the transparent shield 16 may preferably include a plurality of transparent shield openings 36. The plurality of transparent shield openings 36 may preferably receive the plurality of buttons 26 of the button array 14. In particular, the plurality of transparent shield openings 36 may preferably receive the conductive end portion 30 of the plurality of buttons 26. The transparent shield openings 36 allow free movement of the plurality of buttons 26, and in particular, the conductive end portion 30 of the plurality of buttons 26.

Referring to FIGS. 1–3 and 7, a circuit board 38 for controlling the liquid crystal display 20 may also be provided. The circuit board 38 may preferably have a conductive portion arranged on its surface in a specified pattern such as, for example, a screen pattern. The circuit board 38 may preferably be any conventional printed circuit board, which may vary in size depending on the particular functions to be performed. As shown in FIGS. 1–3 and 7, the liquid crystal display 20 may preferably be mounted to the circuit board 38. However, other configurations of the liquid crystal display 20 and the circuit board 38 may be provided. For example, the liquid crystal display 20 may not be operatively attached to the circuit board. Instead, a circuit board that is separate and apart from the liquid crystal display 20 may be used to provide the electrical connections for the button array 14.

Figure 7:
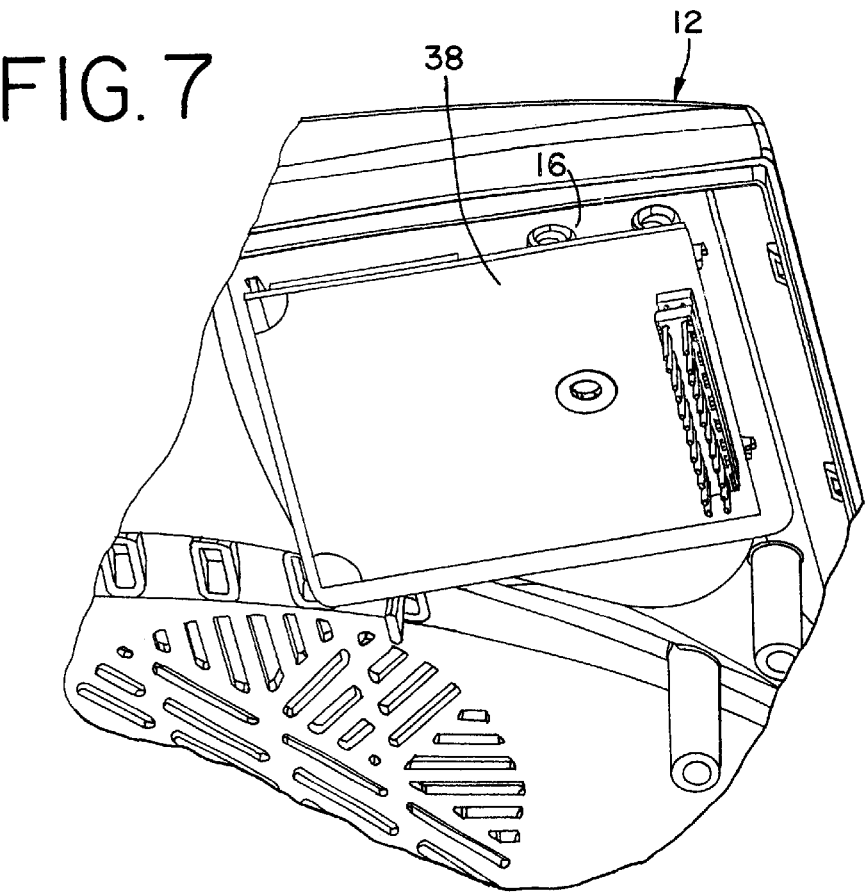
FIG. 7 is the, embodiment of FIG. 6 showing the circuit board attached to the housing.
Figure 8:
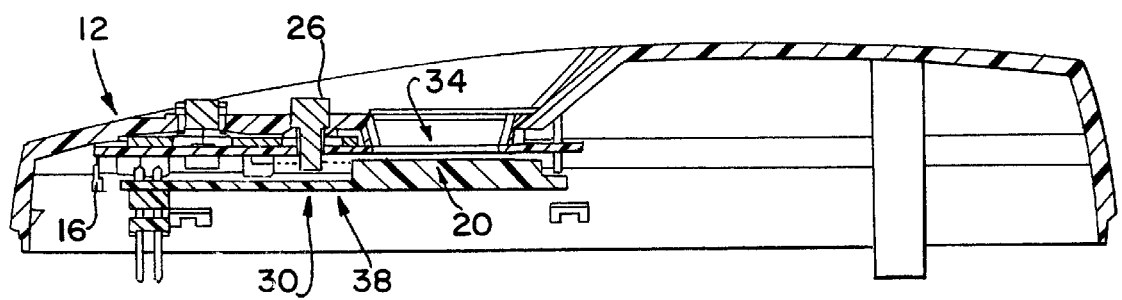
FIG. 8 is a cross sectional view showing the housing, button array, transparent member, and the liquid crystal display assembled.

Referring to FIG. 7, the circuit board 38 may preferably be attached to the housing 12. In particular, the circuit board 38 may preferably be attached to a plurality of flange portions 40, 42, 44, 46 (see FIG. 4) that extend outward generally perpendicular from the inner surface 22 of the housing 12. Also, guide pins 41, 43 also extend outward from the inner surface 22 of the housing 22. As shown in FIG. 6, the flange portions 40, 42, 44, 46 and the guide pins 41, 43 extend through openings in the button array 14 and the transparent shield 16 to ensure that the button array 14 and the transparent shield 16 are properly aligned with respect to the housing 12.

Referring to FIGS. 1–3, a connector 50 may preferably be operatively connected to the circuit board 38. The connector 50 may preferably provide the electrical connection between the circuit board 38 and a main circuit board (not shown) of the electronic device.

When assembled, the button array 14 and the conductive end portion 30 of the plurality buttons 26 are spaced apart from the circuit board 38. As a result, a small gap exists between the button array 14 and the circuit board 38. In operation, when a user depresses one of the plurality of buttons 26, the conductive end portion 30 contacts the circuit board 38, which provides the electrical connection between the conductive end portion 30 and the circuit board 38. The advantage of this arrangement is that it eliminates the alignment problems that arise when the button array 14 is seated on the circuit board 38.

The liquid crystal display apparatus 10 is assembled by positioning the button array 14 against the inner surface 22 of the housing 12. The manually operable portion 28 of the plurality of buttons 26 of the button array 14 may preferably be inserted in the plurality of button openings 32 in the housing 12. The button array 14 is positioned between the inner surface 22 of the housing 12 and the transparent shield 16. The transparent shield 16 is then positioned against the button array 14 and is attached to the housing 12 thereby securing the button array 14 to the inner surface 22 of the housing 12. The conductive end portion 30 of the plurality of buttons 26 of the button array 14 may preferably be inserted in the plurality of transparent shield openings 36.

The transparent shield 16 is positioned between the button array 14 and the liquid crystal display 20 thereby shielding the liquid crystal display 20. The liquid crystal display 20 may preferably be mounted to the circuit board 38, and the circuit board 38 may preferably be attached to the housing 12. In particular, the circuit board 38 may preferably be attached to the plurality of flange portions 40, 42, 46, and 48.

The assembly of the liquid crystal display apparatus 10 is simplified by allowing for the liquid crystal display 20 and the printed circuit board 38 to be assembled in a separate operation from the assembly of the housing 12, the button array 14 and the transparent shield 16. Moreover, the assembly of the liquid crystal display apparatus 10 can be achieved with a minimum amount of steps, thereby reducing manufacturing costs.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A liquid crystal display apparatus comprising:
   a housing including an inner surface, a button array contacting the inner surface of the housing, the button array including a plurality of buttons, the button array positioned between the inner surface of the housing and a transparent shield, the transparent shield contacting the button array and attached to the inner surface of the housing to secure the button array to the inner surface of the housing, the transparent shield positioned between the button array and a liquid crystal display to shield the liquid crystal display.

2. The apparatus of claim 1 wherein the housing includes a plurality of button openings, the plurality of buttons received in the plurality of button openings.

3. The apparatus of claim 2 wherein each of the plurality of buttons includes a manually operable portion, the manually operable portion of each of the plurality of buttons received in the plurality of button openings.

4. The apparatus of claim 1 wherein the transparent shield includes a plurality of transparent shield openings, the plurality of buttons received in the plurality of transparent shield openings.

5. The apparatus of claim 4 wherein each of the plurality of buttons includes a conductive end portion, the conductive end portion of each of the plurality of buttons received in the received in the plurality of transparent shield openings.

6. The apparatus of claim 1 wherein the housing comprises a modem cover.

7. The apparatus of claim 1 wherein the transparent shield is comprised of a polycarbonate.

8. The apparatus of claim 7 wherein the circuit board is attached to the housing.

9. The apparatus of claim 7 further comprising a connector operatively connected to the circuit board.

10. The apparatus of claim 1 wherein the transparent shield is comprised of an acrylic resin.

11. The apparatus of claim 10 wherein housing includes a plurality of flange portions, the circuit board attached to the plurality of flange portions.

12. The apparatus of claim 1 further comprising a circuit board, the liquid crystal display attached to the circuit board.

13. The apparatus of claim 1 wherein the housing includes at least one liquid crystal display opening to allow viewing of the glass panel of the liquid crystal display.

14. The apparatus of claim 1 wherein each of the plurality of buttons includes a conductive end portion for contacting a circuit board.

15. A liquid crystal display apparatus comprising:
    a housing including an inner surface, a button array contacting the inner surface of the housing, the button array including a plurality of buttons, the button array positioned between the inner surface of the housing and a transparent shield, the transparent shield contacting the button array and attached to the inner surface of the housing to secure the button array to the inner surface of the housing, a circuit board and a liquid crystal display mounted to the circuit board, the transparent shield positioned between the button array and the circuit board to shield the liquid crystal display.

16. A method of assembling a liquid crystal display apparatus comprising:

providing a housing including an inner surface, a button array including a plurality of buttons and a transparent shield;

contacting the button array against the inner surface of the housing;

positioning the button array between the inner surface of the housing and the transparent shield;

attaching the transparent shield to the inner surface of the housing;

securing the button array to the inner surface of the housing;

positioning the transparent shield between the button array and a liquid crystal display; and shielding the liquid crystal display.

17. The method of claim 9 comprising:

providing a circuit board; and attaching the liquid crystal display to the circuit board.

18. The method of claim 15 further comprising:

attaching the circuit board to the housing.

19. The method of claim 16 wherein housing includes a plurality of flange portions; and attaching the circuit board to the plurality of flange portions.

20. The method of claim 9 wherein the housing includes a plurality of button openings; and inserting the plurality of buttons in the plurality of button openings.

21. The method of claim 9 wherein the transparent shield includes a plurality of transparent shield openings; and inserting the plurality of buttons in the plurality of transparent shield openings.

* * * * *